(12) United States Patent
Takasu

(10) Patent No.: US 10,521,922 B2
(45) Date of Patent: Dec. 31, 2019

(54) END FACE INSPECTION DEVICE AND FOCUSED IMAGE DATA ACQUISITION METHOD THEREFOR

(71) Applicant: ANRITSU CORPORATION, Kanagawa (JP)

(72) Inventor: Ryota Takasu, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 31 days.

(21) Appl. No.: 15/920,920

(22) Filed: Mar. 14, 2018

(65) Prior Publication Data

US 2018/0276836 A1    Sep. 27, 2018

(30) Foreign Application Priority Data

Mar. 27, 2017    (JP) ................... 2017-060985

(51) Int. Cl.
| | |
|---|---|
| G06K 9/00 | (2006.01) |
| G06T 7/571 | (2017.01) |
| G06T 7/00 | (2017.01) |
| G01M 11/00 | (2006.01) |
| G06T 7/70 | (2017.01) |

(52) U.S. Cl.
CPC ............ G06T 7/571 (2017.01); G01M 11/31 (2013.01); G06T 7/0002 (2013.01); G06T 7/0008 (2013.01); G06T 7/70 (2017.01); G06T 2207/10004 (2013.01); G06T 2207/10148 (2013.01); G06T 2207/10152 (2013.01); G06T 2207/30108 (2013.01)

(58) Field of Classification Search
CPC .............. G06T 7/571; G06T 7/0002; G06T 2207/10148; G06T 2207/10004; G06T 2207/30108; G01M 11/31
See application file for complete search history.

(56) References Cited

U.S. PATENT DOCUMENTS

| | | | | | |
|---|---|---|---|---|---|
| 4,859,842 | A | * | 8/1989 | Suda ................. | G02B 7/346 250/201.8 |
| 5,565,956 | A | * | 10/1996 | Kusaka ................ | G02B 7/346 396/114 |
| 5,650,607 | A | * | 7/1997 | Kusaka ................ | G02B 7/346 250/201.8 |
| 5,875,360 | A | * | 2/1999 | Osawa ................ | G02B 7/346 396/106 |
| 6,031,941 | A | * | 2/2000 | Yano ................... | G06T 7/571 382/154 |

(Continued)

*Primary Examiner* — Amir Alavi
(74) *Attorney, Agent, or Firm* — Pearne & Gordon LLP

(57) ABSTRACT

Provided is an end face inspection device capable of inspecting different end face shapes without replacing an adapter for attachment. An end face inspection device includes: an optical system that forms an image of an end face of a test object, which is fixed at a predetermined position, at a position of an image sensor; and a focus detection section that acquires image data, which is output by the image sensor, and determines whether or not the end face is brought into focus in the image data. The focus detection section acquires a plurality of the image data pieces, in which parts of the end face are brought into focus by changing a focal position of the optical system by a predetermined distance at a time, and acquires focused image data by synthesizing the respective parts brought into focus in the plurality of image data pieces.

14 Claims, 7 Drawing Sheets

(56) References Cited

U.S. PATENT DOCUMENTS

| | | |
|---|---|---|
| 9,217,688 B2 | 12/2015 | Levin et al. |
| 10,313,577 B2 * | 6/2019 | Ohara ................ H04N 5/23212 |
| 2017/0123146 A1 * | 5/2017 | Chen ................ G02B 6/02042 |
| 2018/0152617 A1 * | 5/2018 | Miyake .................. G02B 6/385 |
| 2018/0236496 A1 * | 8/2018 | Takasu .................... B07C 5/342 |
| 2018/0276836 A1 * | 9/2018 | Takasu .................... G06T 7/571 |

* cited by examiner

END FACE INSPECTION DEVICE AND FOCUSED IMAGE DATA ACQUISITION METHOD THEREFOR

TECHNICAL FIELD

The present invention relates to an end face inspection device for inspecting an end face of an optical connector and a focused image data acquisition method therefor.

BACKGROUND ART

Optical connectors for relaying or connecting with other apparatuses are provided at the ends of optical fiber cables used for various types of communications. The optical connector is configured to have a plug housing mounted thereon. The plug housing is connected and fixed to another device or an adapter for relay by inserting an optical fiber into the inner periphery of a ferrule formed in a cylindrical shape and holding the ferrule.

In this optical connector, in a case where there is a scratch or dirt on the end face of a ferrule (including an optical fiber) as a connecting portion, the communication quality of the optical fiber deteriorates. For this reason, in a case where an operation for forming an optical connector is performed by performing an end treatment of an optical fiber cable, an optical connector end face inspection device that inspects the state of the end face of the ferrule of the formed optical connector is used.

In this optical connector end face inspection device, an image of the end face of the ferrule of the optical connector as a test object is captured with a camera, and the captured image is magnified and observed to find a scratch or dirt.

Patent Document 1 discloses an optical connector end face inspection device using a probe having an autofocus function.

RELATED ART DOCUMENT

Patent Document

[Patent Document 1] U.S. Pat. No. 9,217,688

DISCLOSURE OF THE INVENTION

Problem that the Invention is to Solve

As the shape of the end face of the ferrule of the optical connector, there are an ultra physical contact (UPC), in which the end face is polished to be slightly curved or spherically convex, an angled physical contact (APC), in which the end face is polished to be obliquely spherically convex, and the like.

In the case of APC in which the end face is oblique, the entire end face, of which the image is taken at the same angle as that of UPC, is not brought into focus. Thus, it becomes difficult to inspect the end face.

For this reason, an optical connector and an optical connector end face inspection device are connected by using a tip (an adapter) corresponding to the end face shape of the ferrule of the optical connector, and the inspection is performed in a state where the end face is orthogonal to the optical axis of the camera lens.

In a case where such a tip is used, it is necessary to replace the tip every time the shape of the end face changes. Therefore, there is a problem in that it takes time to perform the inspection.

Therefore, it is an object of the present invention to provide an optical connector end face inspection device capable of inspecting different end face shapes without replacing tips.

Means for Solving the Problem

According to a first aspect of the present invention, there is provided an end face inspection device including: an optical system that forms an image of an end face of a test object, which is fixed at a predetermined position, at a position of an image sensor; and a focus detection section that acquires image data, which is output by the image sensor, and determines whether or not the end face is brought into focus in the image data. The focus detection section acquires a plurality of the image data pieces, in which parts of the end face are brought into focus by changing a focal position of the optical system by a predetermined distance at a time, and acquires focused image data by synthesizing the respective parts brought into focus in the plurality of image data pieces.

With such a configuration, focused image data is synthesized from the plurality of image data pieces. Therefore, it is possible to inspect different end face shapes without replacing the tips.

According to a second aspect of the present invention, in the end face inspection device of the first aspect of the present invention, the focus detection section further detects whether or not the end face is inclined on the basis of a brightness of the image of the end face by changing a direction of irradiation of illumination light illuminated on the end face, acquires the plurality of the image data pieces in which the parts of the end face are brought into focus by changing the focal position of the optical system by a predetermined distance at a time under a condition of detection of inclination of the end face, and acquires focused image data by synthesizing the respective parts brought into focus in the plurality of image data pieces.

With such a configuration, it is detected whether or not the end face is inclined. In a case where the end face is inclined, the focused image data is synthesized from the plurality of image data pieces. Therefore, it is possible to inspect different end face shapes without replacing the tips.

According to a third aspect of the present invention, in the end face inspection device of the second aspect of the present invention, the optical system includes: a slit plate that is provided with a slit passing only a part of illumination light from a light source; and a light source axis correction element that changes an angle of travel of the part of the illumination light passing through the slit. The focus detection section changes the direction of irradiation of illumination light illuminated on the end face through the slit plate.

With such a configuration, only a part of the illumination light is illuminated on the end face through the slit plate, and the direction of irradiation of the illumination light is changed by changing the illumination light passing through the slit plate. Therefore, it is possible to easily change the direction of irradiation of the illumination light.

According to a fourth aspect of the present invention, in the end face inspection device of the second aspect of the present invention, the focus detection section selects pixels which are synthesized from the plurality of image data pieces on the basis of an angle of inclination and a direction of inclination of the end face under the condition of detection of inclination of the end face.

With such a configuration, pixels of the focused image data are selected on the basis of the angle of inclination and the direction of inclination of the end face. Therefore, it is possible to easily synthesize the focused image data.

According to a fifth aspect of the present invention, in the end face inspection device of the third aspect of the present invention, the focus detection section selects pixels which are synthesized from the plurality of image data pieces on the basis of an angle of inclination and a direction of inclination of the end face under the condition of detection of inclination of the end face.

With such a configuration, pixels of the focused image data are selected on the basis of the angle of inclination and the direction of inclination of the end face. Therefore, it is possible to easily synthesize the focused image data.

According to a sixth aspect of the present invention, in the end face inspection device of the fourth aspect of the present invention, the focus detection section detects a direction of inclination of the end face on the basis of the direction of irradiation of illumination light illuminated on the end face in a case where a brightness of the image of the end face is highest.

With such a configuration, the direction of inclination of the end face is detected on the basis of the direction of irradiation of the illumination light illuminated on the end face. Therefore, it is possible to easily detect the direction of inclination of the end face.

According to a seventh aspect of the present invention, in the end face inspection device of the fifth aspect of the present invention, the focus detection section detects a direction of inclination of the end face on the basis of the direction of irradiation of illumination light illuminated on the end face in a case where a brightness of the image of the end face is highest.

With such a configuration, the direction of inclination of the end face is detected on the basis of the direction of irradiation of the illumination light illuminated on the end face. Therefore, it is possible to easily detect the direction of inclination of the end face.

According to an eighth aspect of the present invention, there is provided a focused image data acquisition method of an end face inspection device including an optical system that forms an image of an end face of a test object, which is fixed at a predetermined position, at a position of an image sensor, the focused image data acquisition method including: a plural image acquisition step of acquiring a plurality of the image data pieces in which parts of the end face are brought into focus by changing a focal position of the optical system by a predetermined distance at a time; and a focused image data acquisition step of acquiring focused image data by synthesizing the respective parts brought into focus in the plurality of image data pieces.

With such a configuration, focused image data is synthesized from the plurality of image data pieces. Therefore, it is possible to inspect different end face shapes without replacing the tips.

According to a ninth aspect of the present invention, the focused image data acquisition method of the end face inspection device of the eighth aspect of the present invention further includes an inclination detection step of detecting whether or not the end face is inclined on the basis of a brightness of the image of the end face by changing a direction of irradiation of illumination light illuminated on the end face. In the inclination detection step, the plural image acquisition step is performed under a condition of detection of inclination of the end face.

With such a configuration, it is detected whether or not the end face is inclined. In a case where the end face is inclined, the focused image data is synthesized from the plurality of image data pieces. Therefore, it is possible to inspect different end face shapes without replacing the tips.

Advantage of the Invention

According to the present invention, it is possible to provide an optical connector end face inspection device capable of inspecting different end face shapes without replacing tips.

BEST MODE FOR CARRYING OUT THE INVENTION

Hereinafter, an optical connector end face inspection device according to an embodiment of the present invention will be described in detail with reference to the drawings.

Figure 1:
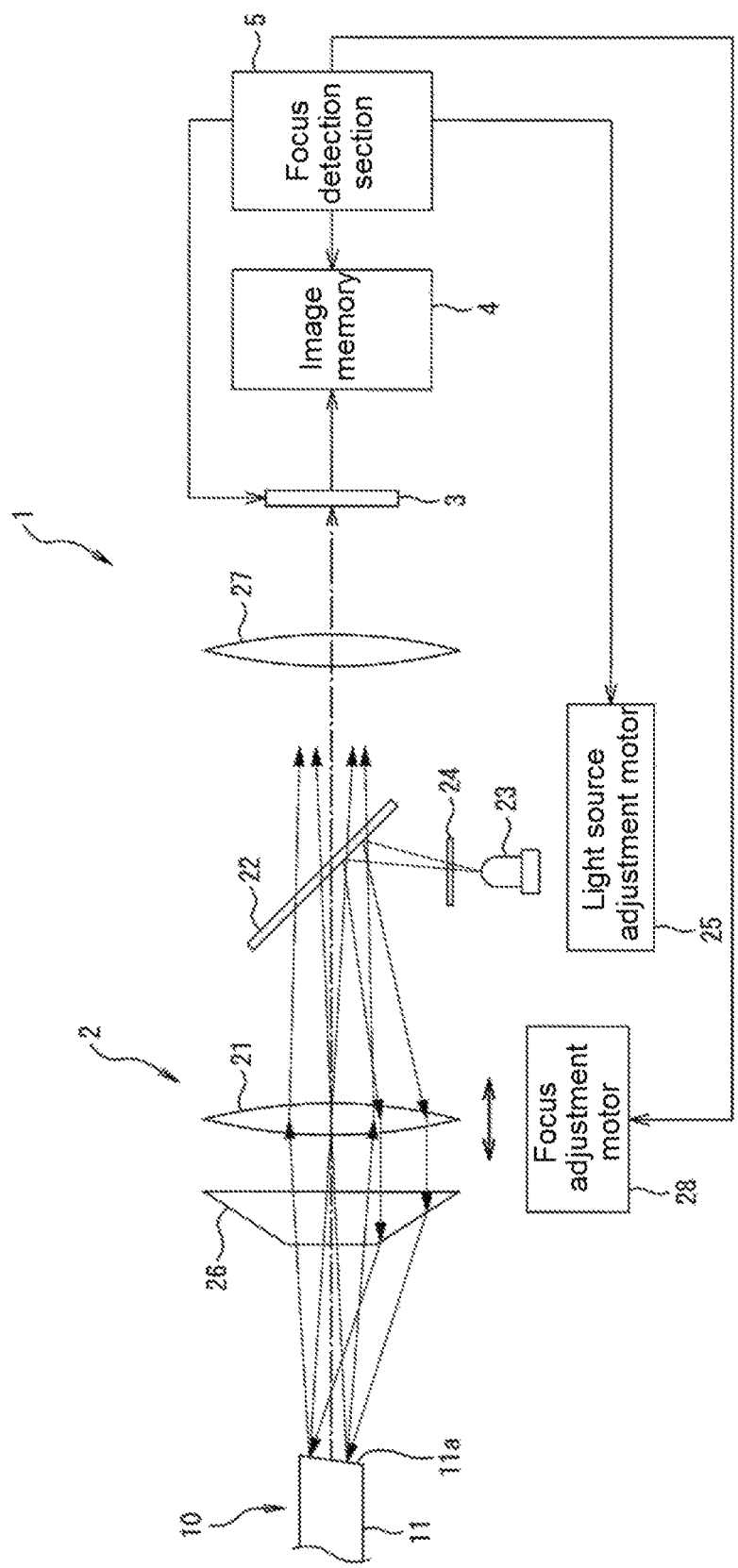
FIG. 1 is a schematic configuration diagram of an optical connector end face inspection device according to an embodiment of the present invention.

In FIG. 1, an optical connector end face inspection device 1 according to an embodiment of the present invention is configured to include an optical system 2, an image sensor 3, an image memory 4, and a focus detection section 5.

In the optical connector end face inspection device 1 of the present embodiment, an end face 11a (including the end face of an optical fiber 12 which is not shown in the drawing and enclosed in a ferrule 11) of the ferrule 11, which constitutes an optical connector 10 held by a connector holding portion not shown in the drawing, is magnified through the optical system 2, and an image thereof is captured through the image sensor 3.

The optical system 2 includes a lens 21, a half mirror 22, an illumination light emitting diode (LED) 23, a slit plate 24, a light source adjustment motor 25, a light source axis correction element 26, a lens 27, and a focus adjustment motor 28.

The lens 21 is provided so as to be opposed to the end face 11a of the ferrule 11 held by the connector holding portion, and provided such that the optical axis thereof is positioned substantially coaxially with the ferrule 11 and the central axis of the optical fiber.

The focusing motor 28 moves the lens 21 in a direction parallel to its optical axis, and thereby the focus of the image formed on the image sensor 3 can be adjusted. The half mirror 22 is disposed on the side of the lens 21 opposite to the ferrule 11, and illuminates the end face 11a of the ferrule 11 with the illumination light, which is originated from the illumination LED 23, through the lens 21. The illumination light illuminated on the end face 11a of the ferrule 11 is reflected by the end face 11a of the ferrule 11, and the reflected light is illuminated on the image sensor 3 through the lens 21, the half mirror 22, and the lens 27. The image sensor 3 converts the illuminated reflected light into image data, and outputs the data.

Figure 2:
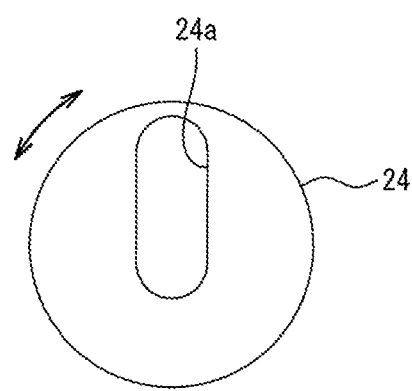
FIG. 2 is a front view of a slit plate of an optical connector end face inspection device according to an embodiment of the present invention.

As shown in FIG. 2, the slit plate 24 has a slit 24a provided on a circular plate, and only the illumination light, which is originated from the illumination LED 23 and passes through a part of the slit 24a, is illuminated on the end face 11a by the half mirror 22. The light source adjustment motor 25 rotates the slit plate 24 around the center of the circle of the slit plate 24 as indicated by the arrow in FIG. 2. For example, as shown in FIG. 2, the slit 24a is formed such that a hole is drilled straight from the center of the slit plate 24 in the outer peripheral direction with a circle having a predetermined diameter.

The light source axis correction element 26 is disposed between the ferrule 11 and the lens 21, and changes the angle of travel of a part of the illumination light originated from the illumination LED 23. The light source axis correction element 26 is formed in a shape in which a cone is cut at a predetermined height in parallel with the bottom surface thereof. The illumination light originated from the illumination LED 23 travels in parallel with the optical axis of the lens 21 on the surface which is cut in parallel with the bottom surface of the light source axis correction element 26, and travels from the inclined surface of the light source axis correction element 26 at an angle.

The angle of inclination of the inclined surface of the light source axis correction element 26 depends on the angle of inclination of the end face of the ferrule to be inspected. That is, in a case where the end face 11a of the ferrule 11 is inclined, the angle of inclination of the inclined surface of the light source axis correction element 26 is set such that the direction of travel of the light, which passes through the part of the inclined surface of the light source axis correction element 26 and is reflected by the end face 11a of the ferrule 11, is parallel to the optical axis of the lens 21.

In a case where the end face 11a of the ferrule 11 has a shape orthogonal to the optical axis of the lens 21, the irradiation light, which passes through the plane cut in parallel with the bottom face of the light source axis correction element 26, is illuminated perpendicularly to the end face 11a of the ferrule 11.

In such a manner, since the light source axis correction element 26 is provided, even in a case where the end face 11a of the ferrule 11 is inclined, the illumination light can be illuminated to be reflected toward the lens 21 by the end face 11a. Therefore, it is possible to acquire a clear image of the end face 11a.

Further, since the slit plate 24 is provided, the direction of the illumination light to be illuminated on the end face 11a of the ferrule 11 can be restricted. That is, although the illumination light can be illuminated from the outer circumference side of the ferrule 11 toward the central axis by the light source axis correction element 26, this illumination light can be made to be light to be illuminated in one direction at any one angle of the angles about the central axis of the ferrule 11 by the slit plate 24.

The image sensor 3 stores the captured image data in the image memory 4 in response to an instruction from the focus detection section 5.

The image memory 4 stores data of the image captured by the image sensor 3. The image memory 4 can store about 100 image data pieces.

The focus detection section 5 is constituted by a computer unit having a central processing unit (CPU) not shown in the drawing, a random access memory (RAM), a read only memory (ROM), a storage device, and an input/output port.

In the ROM and a hard disk drive of this computer unit, a program for causing the computer unit to function as the focus detection section 5 is stored together with various control constants, various maps, and the like. That is, in a case where the CPU executes the program stored in the ROM and the hard disk device, the computer unit functions as the focus detection section 5. The image sensor 3, the image memory 4, the light source adjustment motor 25, and the focus adjustment motor 28 are connected to the input/output port of the focus detection section 5.

The focus detection section 5 controls the light source adjustment motor 25 so as to rotate the slit plate 24 by a preset angle, and causes the image sensor 3 to capture an image.

The focus detection section 5 calculates the average value of the brightness of the entirety of the image captured by changing the angle of the slit plate 24. In a case where the differences between the average values of the brightness (in other words, the variation of the brightness) are equal to or less than a preset value, it is determined that the end face 11a of the ferrule 11 is a UPC connector orthogonal to the optical axis of the lens 21. Then, focused image data which is data in a case where the end face 11a of the ferrule 11 is brought into focus is obtained by controlling the focus adjustment motor 28.

Figure 3:
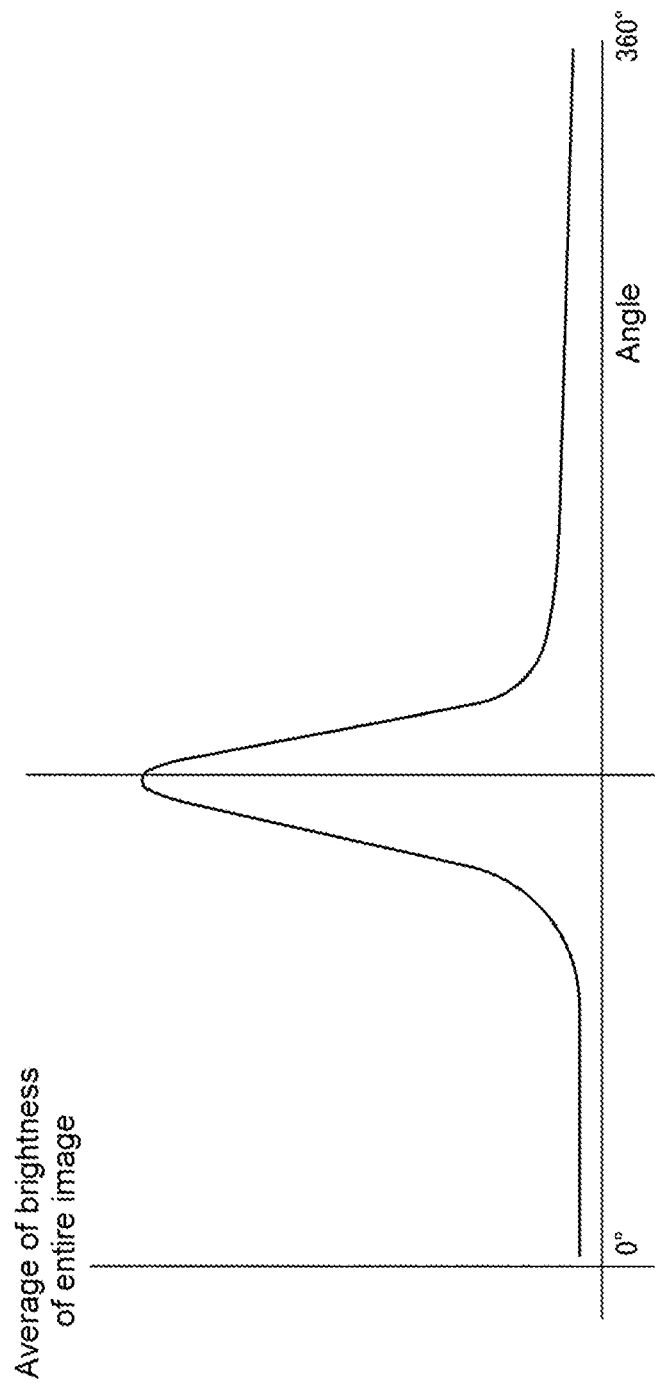
FIG. 3 is a graph illustrating an example of the average brightness of the entire image for each angle of rotation of the slit plate of the optical connector end face inspection device according to an embodiment of the present invention.

As shown in FIG. 3, in a case where the difference between the average values of the brightness (in other words, the variation in the brightness) is greater than the preset value, the focus detection section 5 determines that the end face 11a of the ferrule 11 is an APC connector which is inclined. The focus detection section 5 fixes the slit plate 24 at the angle at which the image having the maximum average brightness is captured. By rotating the slit plate 24, the direction of the illumination light to be illuminated on the end face 11a is changed, search for an angle at which illumination light can be illuminated perpendicularly to the end face 11a is performed, and the slit plate 24 is fixed at that angle. Depending on the angle of the slit plate 24, it is possible to detect the direction of inclination of the end face 11a of the ferrule 11 inserted into the connector holding portion, and the illumination light can be illuminated to be reflected toward the lens 21 by the inclined end face 11a. The direction of inclination is a direction in which the angle of inclination of the end face 11a is the maximum at any point of the end face 11a.

In a case where it is determined that the end face 11a of the ferrule 11 is inclined, the focus detection section 5 acquires a plurality of image data pieces in which parts of the end face 11a are brought into focus by changing the focal position by a predetermined distance at a time, and acquires focused image data, in which the entire end face 11a is in focus, by synthesizing the respective parts brought into focus in the plurality of image data pieces.

Figure 4:
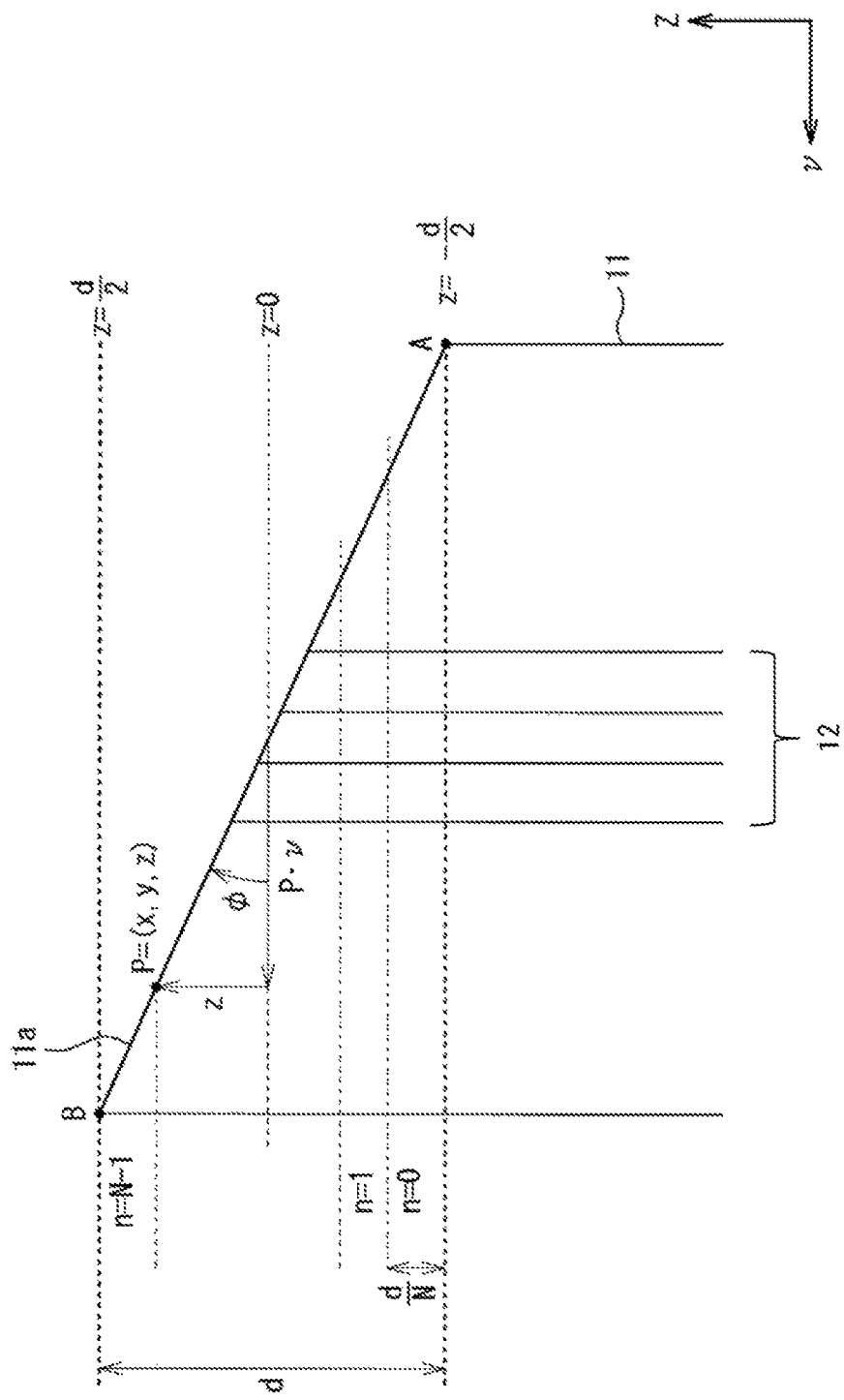
FIG. 4 is a cross-sectional view of a direction of inclination passing through the center of the end face of the optical connector end face inspection device according to an embodiment of the present invention.

Therefore, in this embodiment, as shown in FIG. 4, a distance d [μm] of the lens 21 in the direction of the optical axis from one end (indicated by "A" in the drawing) of the end face 11a in the direction of inclination passing through the center of the end face 11a to the other end (indicated by "B" in the drawing) is equally divided by N, N images, in which the end face 11a is brought into focus, within the respective divided areas are captured, and the focused parts of the respective images are synthesized. The number of divisions N is determined on the basis of the depth of field of the lens, the angle of inclination of the end face 11a of the ferrule 11, and the like. The number of divisions N is the number of divisions of an image by which a focused image can be obtained by synthesizing focused parts of the captured images.

Specifically, in a state where the slit plate 24 is fixed, the focus detection section 5 controls the focus adjustment motor 28 so as to search for a lens position at which the center of the end face 11a of the ferrule 11 is in focus. This is a normal autofocus process, for example, a process of determining whether the center is in focus on the basis of the luminance difference between adjacent pixels.

The focus detection section 5 moves the focal position from the lens position, at which the center of the end face 11a of the ferrule 11 is in focus, in a direction in which the focal position approaches the end face 11a of the ferrule 11 by a preset distance, and captures an image thereof. Here, the preset distance is d/2-d/2N [μm]. That is, in FIG. 4, the focal position of the lens 21 is moved to an in-focus position in the range of d/N on a side close to the lens 21 in the direction of optical axis of the lens 21 from one end A of the end face 11a.

The focus detection section 5 moves the lens position such that the focal position moves by a distance d/N [μm] at a time in a direction away from the end face 11a of the ferrule 11 to capture an image, thereby acquiring N images.

The focus detection section 5 sets the number of the first captured image to zero, and sets the number of the last captured image to N−1.

Figure 5:
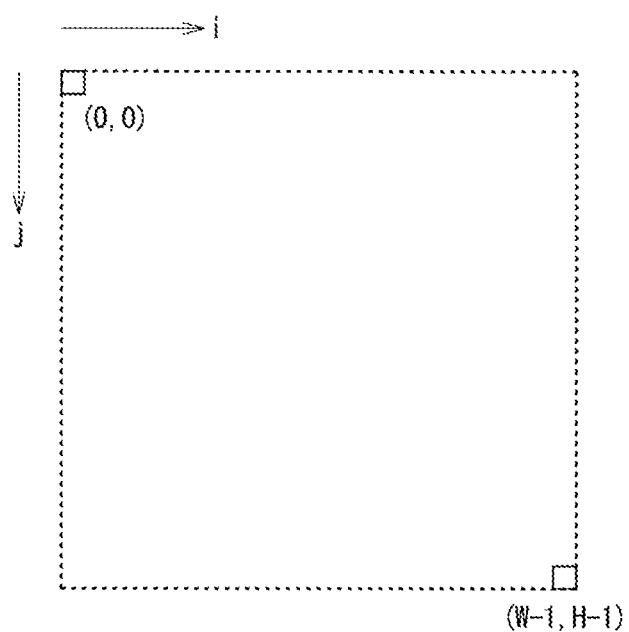
FIG. 5 is a diagram illustrating coordinates of extracted pixels of the optical connector end face inspection device according to an embodiment of the present invention.

As shown in FIG. 5, the focus detection section 5 cuts out an area with a size of horizontal W dots and vertical H dots centered on the point at which the center of the end face 11a of the ferrule 11 of the pixels of the image sensor 3 is imaged. Then, in a case where the pixel on the upper left is represented as (0, 0), a dot, which is shifted by i dots in the right direction and is shifted by j dots in the downward direction, is represented as (i, j).

The focus detection section 5 synthesizes the focused image data by selecting the pixel of (i, j) from the pixels of the image number n(i, j) calculated by the following Numerical Expression 1.

$$n(i, j) = \text{saturate} \left( \text{floor}\left( \left( \frac{(x \cos \theta + y \sin \theta) \tan \phi}{d} + \frac{1}{2} \right) N \right), 0, N-1 \right)$$

$$x = \delta\left(i - \frac{W}{2}\right)$$

$$y = \delta\left(\frac{H}{2} - j\right)$$

[Numerical Expression 1]

Here, θ is an angle of the position of the slit 24a of the slit plate 24 at the time of imaging, and φ is a polishing angle (angle of inclination) of the end face 11a of the ferrule 11. The angle of inclination is the maximum value of the angle of inclination of the end face 11a at any point of the end face 11a.

Further, δ is a distance between pixels on a plane orthogonal to the optical axis of the lens 21 at the end face 11a. That is, as shown in FIG. 6, (x, y) is a value of the XY coordinates in which the center of the end face 11a on the plane orthogonal to the optical axis of the lens 21 of the end face 11a is set to (0, 0).

A saturate (x, a, b) is a function that keeps the value x within the range of the lower limit a and the upper limit b. A floor (x) is a function that finds the largest integer equal to or less than the value x.

Figure 6:
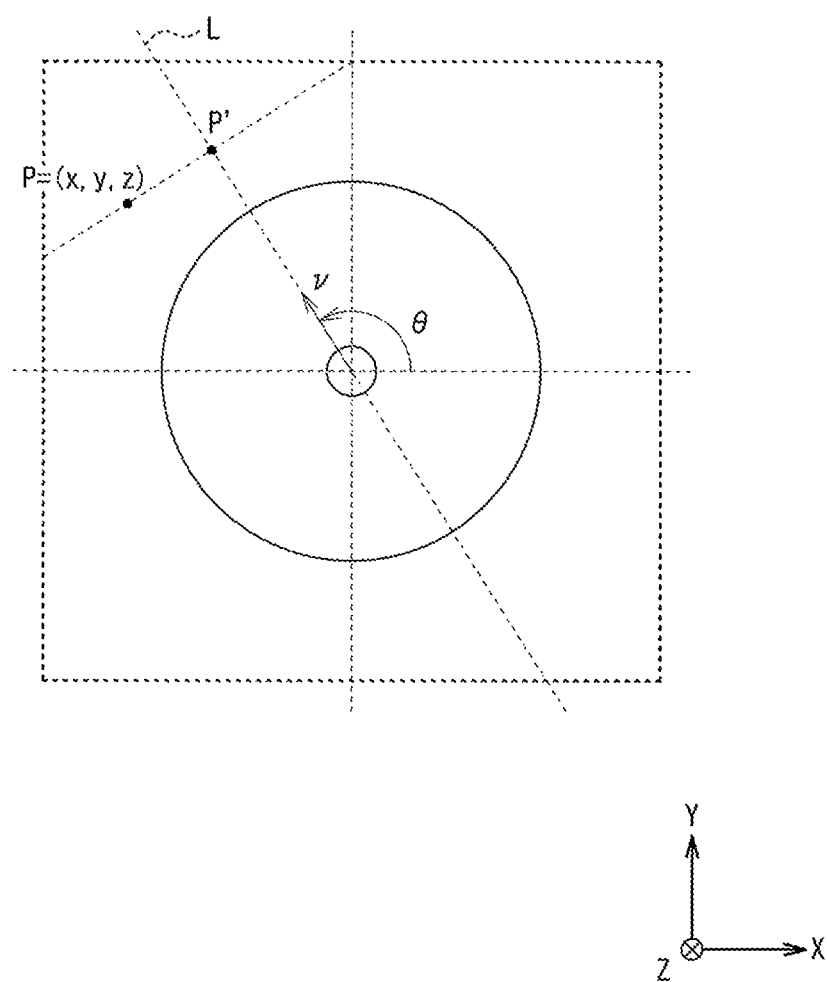
FIG. 6 is a view of an end face viewed from the direction of optical axis of the lens of the optical connector end face inspection device according to an embodiment of the present invention.

As shown in FIGS. 4 and 6, the XYZ coordinates are considered, in which the X axis and Y axis are taken on a plane perpendicular to the optical axis of the lens 21, the Z axis is taken in the direction of optical axis of the lens 21, and the center of the end face 11a is (0, 0, 0).

Which image should be selected at a point P whose coordinate value is (x, y, z) depends on the position of the point in the direction of optical axis of the lens 21 on the cross section passing through the center of the end face 11a in the direction of inclination. As shown in FIG. 4, at the point P, the integer part obtained by dividing z+d/2 by d/N becomes the image number n. In other words, the image number n is represented by Numerical Expression 2.

$$n = \text{floor}\left( \left( z + \frac{d}{2} \right)\frac{N}{d} \right) = \text{floor}\left( \left( \frac{z}{d} + \frac{1}{2} \right) N \right)$$

[Numerical Expression 2]

In FIG. 6, the unit vector v in the direction of the straight line L in the direction of inclination passing through the center of the end face 11a is a vector obtained by rotating the unit vector in the X axis direction around the Z axis by θ degrees counterclockwise. Since the value of z at the point P' on the straight line which is orthogonal to the straight line L and passes through the point P is equal to the value of z at the point P, z on the cross section in the direction of inclination passing through the center of the end face 11a may be obtained. Assuming that the distance from the center of the end face 11a on the XY plane of the point P' is pv, z is represented by z=pv·tan φ, as shown in FIG. 4.

In FIG. 6, pv is a value of the X coordinate of the point P obtained by rotating the XY coordinates by θ in the counterclockwise direction, such that pv=x cos θ+y sin θ. That is, z=(x cos θ+y sin θ)tan φ. In a case where this is substituted into Numerical Expression 2, Numerical Expression 1 is obtained. In Numerical Equation 1, restrictions on the upper limit value and the lower limit value are set in consideration of points which are not present on the end face 11a.

In such a manner, the direction of the inclination of the end face 11a of the ferrule 11 is detected by the slit plate 24, focused images of the respective pixels are selected from the angle θ of the position of the slit 24a of the slit plate 24 and the polishing angle φ of the end face 11a of the ferrule 11 at this time, and are synthesized. Therefore, it is possible to acquire focused image data of the end face 11a of the ferrule 11 which is polished obliquely without replacing tips, and inspection can be performed.

Figure 7:
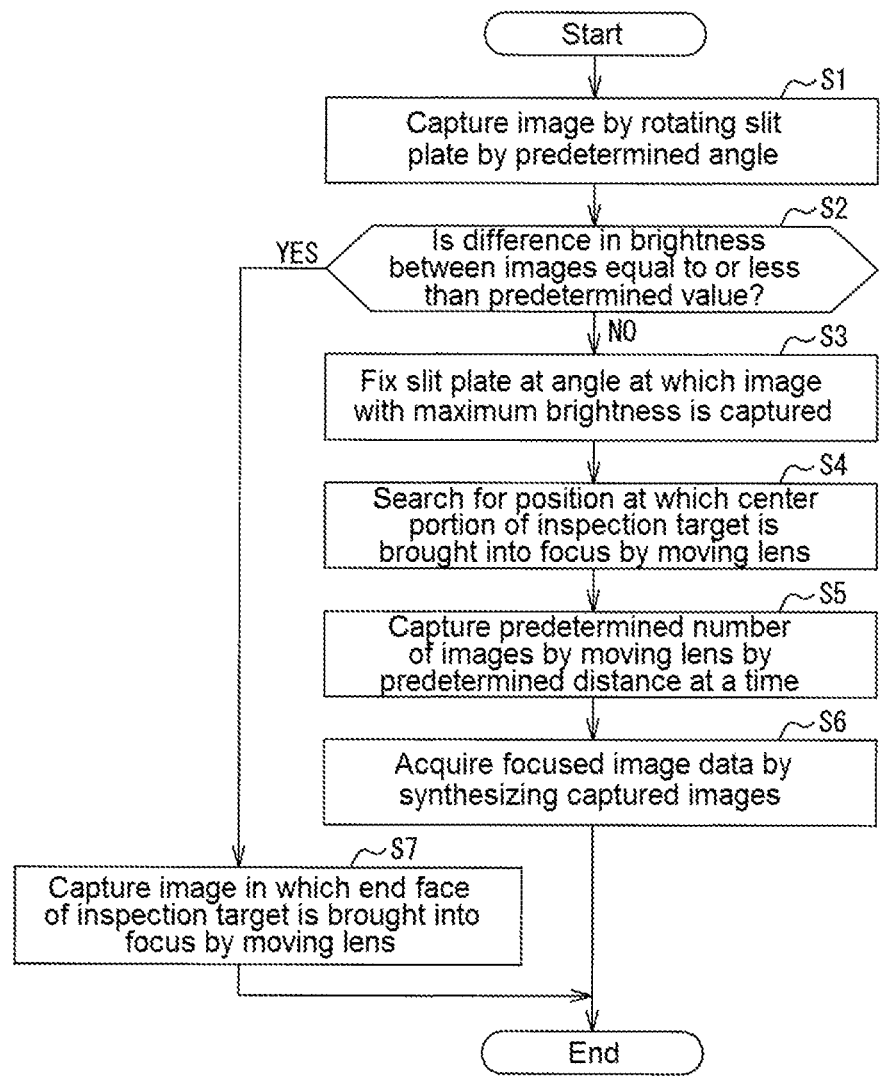
FIG. 7 is a flowchart illustrating a procedure of focus detection processing of the optical connector end face inspection device according to an embodiment of the present invention.

The focus detection processing, which is performed by the optical connector end face inspection device 1 according to the present embodiment configured as described above, will be described with reference to FIG. 7. Since the optical connector 10 is held by the connector holding portion, the focus detection processing described below is started, for example, by pressing the focusing switch.

In step S1, the focus detection section 5 captures an image by rotating the slit plate 24 by a predetermined angle at once.

In step S2, the focus detection section 5 calculates the average value of the brightness of each image, and determines whether or not the maximum value of the difference between the average values of the brightness is equal to or less than a predetermined value. In a case where it is determined that the maximum value of the difference between the average values of the brightness is equal to or less than the predetermined value, the focus detection section 5 obtains focused image data, in which the end face 11a of the inspection target ferrule 11 is in focus, by controlling the focus adjustment motor 28 in step S7, and the process is terminated.

In a case where it is determined that the maximum value of the difference between the average values of the brightness is not less than the predetermined value, in step S3, the focus detection section 5 fixes the slit plate 24 at the angle at which the image with the maximum average brightness is captured.

In step S4, the focus detection section 5 moves the lens 21 by the focus adjustment motor 28, and searches for the lens position at which the center portion of the end face 11a of the ferrule 11 to be inspected is in focus.

In step S5, the focus detection section 5 moves the focal position from the lens position, at which the center portion of the end face 11a of the ferrule 11 is in focus, in a direction in which the focal position approaches the end face 11a of the ferrule 11 by a preset distance, and captures an image thereof. Then, the lens position is moved away from the end face 11a of the ferrule 11 by d/N [µm] at a time, and an image thereof is captured. As a result, N images are acquired.

In step S6, the focus detection section 5 synthesizes the images captured on the basis of Numerical Expression 1, thereby obtaining focused image data, and ends the process.

In the present embodiment, the case of inspecting the ferrule 11 and the end face 11a of the optical fiber has been described, but the present invention is not limited thereto. For example, the present invention can be used also for inspecting the end face of a solid object.

Although embodiments of the present invention have been disclosed, it will be apparent to those skilled in the art that modifications may be made without departing from the scope of the present invention. All such modifications and equivalents are intended to be included in the following claims.

DESCRIPTION OF REFERENCE NUMERALS AND SIGNS 1 optical connector end face inspection device
2 optical system
3 image sensor
5 focus detection section
10 optical connector
11 ferrule
11a end face of ferrule (which includes end face of optical fiber)
12 optical fiber
21 lens
22 half mirror
23 illumination LED (light source)
24 slit plate
24a slit
25 light source adjustment motor
26 light source axis correction element
28 focus adjustment motor

What is claimed is:

1. An end face inspection device comprising:
an optical system that forms an image of an end face of a test object, which is fixed at a predetermined position, at a position of an image sensor; and
a focus detection section that acquires image data, which is output by the image sensor, and determines whether or not the end face is brought into focus in the image data,
wherein the focus detection section acquires a plurality of the image data pieces, in which parts of the end face are brought into focus by changing a focal position of the optical system by a predetermined distance at a time, and acquires focused image data by synthesizing the respective parts brought into focus in the plurality of image data pieces.

2. The end face inspection device according to claim 1, wherein the focus detection section further detects whether or not the end face is inclined on the basis of a brightness of the image of the end face by changing a direction of irradiation of illumination light illuminated on the end face, acquires the plurality of the image data pieces in which the parts of the end face are brought into focus by changing the focal position of the optical system by a predetermined distance at a time under a condition of detection of inclination of the end face, and acquires focused image data by synthesizing the respective parts brought into focus in the plurality of image data pieces.

3. The end face inspection device according to claim 2, wherein the optical system includes a slit plate that is provided with a slit passing only a part of illumination light from a light source, and a light source axis correction element that changes an angle of travel of the part of the illumination light passing through the slit,
wherein the focus detection section changes the direction of irradiation of illumination light illuminated on the end face through the slit plate.

4. The end face inspection device according to claim 3, wherein the focus detection section selects pixels which are synthesized from the plurality of image data pieces on the basis of an angle of inclination and a direction of inclination of the end face under the condition of detection of inclination of the end face.

5. The end face inspection device according to claim 4, wherein the focus detection section detects a direction of inclination of the end face on the basis of the direction of irradiation of illumination light illuminated on the end face in a case where a brightness of the image of the end face is highest.

6. The end face inspection device according to claim 2, wherein the focus detection section selects pixels which are synthesized from the plurality of image data pieces on the basis of an angle of inclination and a direction of inclination of the end face under the condition of detection of inclination of the end face.

7. The end face inspection device according to claim 6, wherein the focus detection section detects a direction of inclination of the end face on the basis of the direction of irradiation of illumination light illuminated on the end face in a case where a brightness of the image of the end face is highest.

8. A focused image data acquisition method of an end face inspection device including an optical system that forms an image of an end face of a test object, which is fixed at a predetermined position, at a position of an image sensor, the focused image data acquisition method comprising:

a plural image acquisition step of acquiring a plurality of the image data pieces in which parts of the end face are brought into focus by changing a focal position of the optical system by a predetermined distance at a time; and a focused image data acquisition step of acquiring focused image data by synthesizing the respective parts brought into focus in the plurality of image data pieces.

9. The focused image data acquisition method of the end face inspection device according to claim 8, further comprising an inclination detection step of detecting whether or not the end face is inclined on the basis of a brightness of the image of the end face by changing a direction of irradiation of illumination light illuminated on the end face, wherein in the inclination detection step, the plural image acquisition step is performed under a condition of detection of inclination of the end face.

10. The end face inspection device according to claim 9, wherein the optical system includes a slit plate that is provided with a slit passing only a part of illumination light from a light source, and a light source axis correction element that changes an angle of travel of the part of the illumination light passing through the slit, wherein the focus detection section changes the direction of irradiation of illumination light illuminated on the end face through the slit plate.

11. The end face inspection device according to claim 10, further comprising a pixel selection step of selecting pixels which are synthesized from the plurality of image data pieces on the basis of an angle of inclination and a direction of inclination of the end face under the condition of detection of inclination of the end face.

12. The end face inspection device according to claim 11, further comprising a direction detection step of detecting a direction of inclination of the end face on the basis of the direction of irradiation of illumination light illuminated on the end face in a case where a brightness of the image of the end face is highest.

13. The end face inspection device according to claim 9, further comprising a pixel selection step of selecting pixels which are synthesized from the plurality of image data pieces on the basis of an angle of inclination and a direction of inclination of the end face under the condition of detection of inclination of the end face.

14. The end face inspection device according to claim 13, further comprising a direction detection step of detecting a direction of inclination of the end face on the basis of the direction of irradiation of illumination light illuminated on the end face in a case where a brightness of the image of the end face is highest.

* * * * *